United States Patent
Sugiyama et al.

(10) Patent No.: US 9,103,404 B2
(45) Date of Patent: Aug. 11, 2015

(54) DAMPER DEVICE FOR VEHICLE

(75) Inventors: Masataka Sugiyama, Toyota (JP); Hiroaki Kimura, Toyota (JP); Tadashi Takemura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/126,306

(22) PCT Filed: Jun. 14, 2011

(86) PCT No.: PCT/JP2011/063617
§ 371 (c)(1),
(2), (4) Date: Dec. 13, 2013

(87) PCT Pub. No.: WO2012/172646
PCT Pub. Date: Dec. 20, 2012

(65) Prior Publication Data
US 2014/0138203 A1    May 22, 2014

(51) Int. Cl.
*F16F 15/129*    (2006.01)
*F16F 15/139*    (2006.01)
*F16D 3/64*    (2006.01)

(52) U.S. Cl.
CPC .............. *F16F 15/139* (2013.01); *F16D 3/64* (2013.01); *F16F 15/1292* (2013.01); *F16F 15/1295* (2013.01)

(58) Field of Classification Search
CPC .... F16D 3/64; F16F 15/1292; F16F 15/1295; F16F 15/139; F16F 15/1392; F16F 15/1395
USPC ................... 464/68.4, 68.41; 192/210, 210.1, 192/213.11, 213.12, 213.21–214.1
See application file for complete search history.

(56) References Cited

U.S. PATENT DOCUMENTS

| | | | |
|---|---|---|---|
| 4,538,718 A * | 9/1985 | Maucher | 192/213.31 |
| 5,120,276 A | 6/1992 | Maucher et al. | |
| 5,123,877 A | 6/1992 | Maucher et al. | |
| 5,151,065 A | 9/1992 | Maucher et al. | |
| 5,180,335 A | 1/1993 | Maucher et al. | |

(Continued)

FOREIGN PATENT DOCUMENTS

| | | |
|---|---|---|
| FR | 2 386 728 A1 | 11/1978 |
| JP | 06 085950 | 12/1994 |

(Continued)

OTHER PUBLICATIONS

International Search Report Issued Jul. 12, 2011 in PCT/JP11/063617 Filed Jun. 14, 2011.

*Primary Examiner* — Gregory Binda
(74) *Attorney, Agent, or Firm* — Oblon, McClelland, Maier & Neustadt, L.L.P.

(57) ABSTRACT

Providing a vehicle damper device enabling acquisition of hysteresis torque with a simple structure.
When the stoppers 96 and 97 are actuated and the relative rotation is regulated between the plates 90, 92 and the disc plate 56, a slip occurs between the plates 90, 92 and the hub member 58. As a result, a friction force is generated between the plates 90, 92 and the hub member 58, and a hysteresis torque is generated based on this friction force. Since this configuration can be achieved by simply providing the plates 90, 92, the clip 94, and the stoppers 96, 97, the hysteresis torque can be acquired with a simple configuration without a significant design change.

4 Claims, 5 Drawing Sheets

(56) References Cited

U.S. PATENT DOCUMENTS

| | | | |
|---|---|---|---|
| 5,269,725 | A | 12/1993 | Maucher et al. |
| 5,456,634 | A | 10/1995 | Maucher et al. |
| 5,871,401 | A | 2/1999 | Maucher et al. |
| 8,328,646 | B2 * | 12/2012 | Droll et al. |
| 2004/0082392 | A1 | 4/2004 | Fukushima et al. |
| 2006/0006044 | A1 | 1/2006 | Fukushima et al. |
| 2006/0009296 | A1 | 1/2006 | Fukushima et al. |
| 2006/0096833 | A1 | 5/2006 | Fukushima et al. |
| 2006/0185959 | A1 | 8/2006 | Tsuruta et al. |
| 2010/0051411 | A1 | 3/2010 | Saeki et al. |

FOREIGN PATENT DOCUMENTS

| | | |
|---|---|---|
| JP | 07 071523 | 3/1995 |
| JP | 11 303895 | 11/1999 |
| JP | 2003 278791 | 10/2003 |
| JP | 2004 144133 | 5/2004 |
| JP | 2008 303995 | 12/2008 |
| JP | 2010 053922 | 3/2010 |

* cited by examiner

DAMPER DEVICE FOR VEHICLE

TECHNICAL FIELD

The present invention relates to a vehicle damper device included in a vehicle and particularly to a damper device including a hysteresis mechanism.

BACKGROUND ART

A vehicle damper device is well known that includes a disc plate rotatable around an axial center, a hub member rotatable around the same axial center as the disc plate, and an elastic member interposed between the disc plate and the hub member. A vehicle damper device is also well known that includes a hysteresis mechanism consisting of a friction element between the disc plate and the hub member as in a torque variation absorbing device described in Patent Document 1. A torque variation absorbing device 1 described in Patent Document 1 is disposed with a mechanism generating two-stage hysteresis toques. In a damper device 3 of Patent Document 2, a friction material disposed on a tip of a hub member 25 is pushed when the hub member 25 and a side plate 23 are relatively rotated, thereby generating hysteresis torque. FIG. 9 of Patent Document 3 depicts a second damping device 514 consisting of a friction ring 532, a spring clamp 530, circular plates 524, 525, etc.

PRIOR ART DOCUMENTS

Patent Documents

Patent Document 1: Japanese Laid-Open Patent Publication No. 2008-303995
Patent Document 2: Japanese Laid-Open Patent Publication No. 2010-53922
Patent Document 3: Japanese Laid-Open Patent Publication No. 7-71523

SUMMARY OF THE INVENTION

Problems to be Solved by the Invention

The hysteresis mechanism included in the torque variation absorbing device 1 of Patent Document 1 has a very large number of components, causing a problem of a complicated structure. Particularly, since the torque variation absorbing device is disposed on the inner circumferential side of a coil spring 19, a space for disposing the hysteresis mechanism becomes smaller and it is difficult to dispose the hysteresis mechanism on a small damper device.

Although the damper device 3 of Patent Document 2 has a hysteresis mechanism disposed on the outer circumferential side of a coil spring 27, the number of components is increased by disposing an intermediate member 24 etc., causing a problem of a complicated structure.

In the second damping device 514 of Patent Document 3, the circular plates 524, 525 have a ring shape (whole circumference shape) and the friction ring 532 also has a ring shape. The spring clamp 530 is formed into a substantially ring shape so as to generate a stable friction force between the friction ring 532 and the circular plates 524, 525. As a result, the second damping device 514 is made up of the elements having a length of whole circumference or substantially whole circumference, causing a problem of an increase in size of the elements.

The present invention was conceived in view of the situations and it is therefore an object of the present invention to provide a vehicle damper device enabling acquisition of hysteresis torque with a simple structure.

Means for Solving the Problem

To achieve the object, the first aspect of the invention provides (a) a vehicle damper device having a disc plate rotatable around an axial center, a hub member rotatable around the same axial center as the disc plate, and an elastic member interposed between the disc plate and the hub member, comprising: (b) a friction element including a friction plate portion in sliding contact with the hub member and a pressing portion pushing the friction plate portion against the hub member; and a stopper defining a relative rotation amount between the friction plate portion and the disc plate, (c) the friction element being disposed on an outer circumferential end portion of the hub member.

Effects of the Invention

Consequently, when the stoppers are actuated and the relative rotation is regulated between the friction plate portion and the disc plate, a slip occurs between the friction plate portion and the hub member. As a result, a friction force is generated between the friction plate portion and the hub member, and a hysteresis torque is generated based on this friction force. Since this configuration can be achieved by simply providing the friction element and the stopper, the hysteresis torque can be acquired with a simple configuration without a significant design change. As compared to a conventional two-stage hysteresis mechanism, the number of components is significantly reduced and the structure is simplified.

Although most of the components have a circular plate shape in the conventional hysteresis mechanism, since the friction element is disposed on the outer circumferential end portion of the hub member in the present invention, each of the components has a piece shape. Therefore, a material yield can significantly be improved when the components are manufactured.

Although the conventional two-stage hysteresis mechanism uses expensive high friction material for generating a large hysteresis torque, since the friction element is disposed on the outer circumferential end portion of the hub member in the present invention, the operation radius of the friction element can be made larger. Therefore, the large hysteresis torque can be generated even with conventional friction material including nylon resin etc. Since the friction element is disposed on the outer circumferential end portion of the hub member, a restriction on space is reduced when the hysteresis mechanism is provided, and the versatility becomes very high.

Preferably, at least the two friction elements are disposed, and wherein the relative rotation amount defined by the stopper is differentiated for each of the friction elements. As a result, by shifting the timing when each of the friction elements starts slipping, the hysteresis toque can be changed in stages. For example, when the small hysteresis torque is switched to the large hysteresis torque, the hysteresis torque can be changed in stages to suppress a change in vehicle behavior when the small hysteresis torque is switched to the large hysteresis torque. Therefore, even if a large difference exists between the small hysteresis torque and the large hysteresis torque, the switch can be made and the effect of hysteresis can be maximized.

Preferably, the friction plate portion and the pressing portion making up the friction element are separately configured, and wherein the pressing portion is a clip pinching a pair of the friction plate portions in sliding contact with the hub member. As a result, the friction element is made up of the pair of the friction plate portions and the clip and, therefore, the friction element can be configured with a simple structure having a fewer number of components.

Preferably, the friction plate portion has stepped portions formed at both circumferential ends, and wherein the stepped portions regulate circumferential relative movement of the clip. As a result, even if the clip is displaced in the circumferential direction, the clip abuts on the stepped portions and, therefore, the clip is prevented from coming off.

Preferably, the friction plate portion has a recess formed in a portion abutting on the clip. As a result, since the portion abutting on the clip is fitted into the recess, the clip is prevented from coming off.

Preferably, the friction element is made up of a clip member having the friction plate portion and the pressing portion integrally formed. As a result, the friction element is made up of the clip member and, therefore, the friction element is configured with a simpler structure. Only the clip member increases the number of components and accordingly, the increase in the number of components is suppressed.

Preferably, the stopper is made up of a projection projecting from the friction plate portion toward the disc plate and a cutout formed in the disc plate to regulate a movement amount of the projection. As a result, the stopper can easily be configured without increasing the number of components.

MODE FOR CARRYING OUT THE INVENTION

An example of the present invention will now be described in detail with reference to the drawings. In the following example, the figures are simplified or deformed as needed and portions are not necessarily precisely depicted in terms of dimension ratio, shape, etc.

First Example

Figure 1:
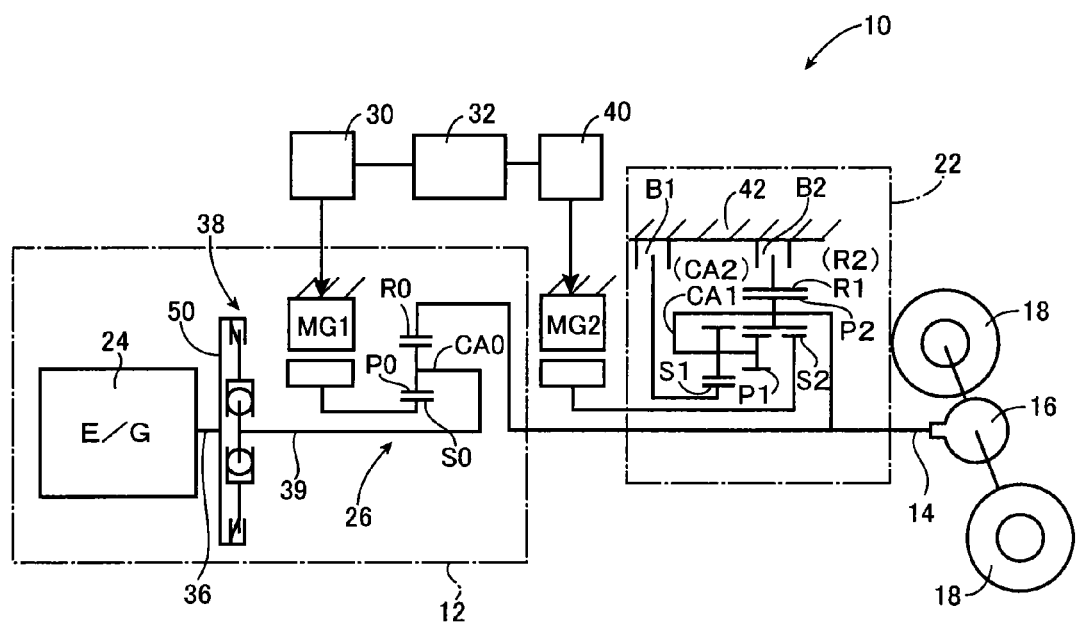
FIG. 1 is a general configuration diagram for explaining a hybrid type vehicle drive device to which the present invention is applied.

FIG. 1 is a general configuration diagram for explaining a hybrid type vehicle drive device 10 to which the present invention is applied. In FIG. 1, the vehicle drive device 10 transmits a torque of a first drive source 12, i.e., a main drive source, to a wheel-side output shaft 14 acting as an output member in a vehicle such that the torque is transmitted from the wheel-side output shaft 14 via a differential gear device 16 to a pair of left and right drive wheels 18. The vehicle drive device 10 is disposed with a second electric motor MG2 capable of selectively providing power running control for outputting drive power for running and regenerative control for recovering energy as a second drive source and the second electric motor MG2 is coupled via an automatic transmission 22 to the wheel-side output shaft. Therefore, output torque transmitted from the second electric motor MG2 to the wheel-side output shaft is increased and decreased depending on a gear ratio γs (=rotation speed Nmg2 of the second electric motor MG2/rotation speed Nout of the wheel-side output shaft) set by the automatic transmission 22.

The automatic transmission 22 interposed in a power transmission path between the second electric motor MG2 and the drive wheels 18 is configured such that a plurality of stages having the gear ratio γs greater than "1" can be established; at the time of power running when a torque is output from the second electric motor MG2, the torque can be increased and transmitted to the wheel-side output shaft; and, therefore, the second electric motor MG2 is configured with a lower capacity or in a smaller size. As a result, for example, if the rotation speed Nout of the wheel-side output shaft is increased in association with a higher vehicle speed, the gear ratio γs is made smaller to reduce the rotation speed (hereinafter referred to as a second electric motor rotation speed) Nmg2 of the second electric motor MG2 so as to maintain the operation efficiency of the second electric motor MG2 in a favorable state, or if the rotation speed Nout of the wheel-side output shaft is reduced, the gear ratio γs is made larger to increase the second electric motor rotation speed Nmg2.

The first drive source 12 is mainly made up of an engine 24 acting as a main power source, a first electric motor MG1, and a planetary gear device 26 acting as a power distribution mechanism for combining or distributing torque between the engine 24 and the first electric motor MG1. The engine 24 is a known internal combustion engine combusting fuel to output power, such as a gasoline engine and a diesel engine, and is configured to have an operational state, such as a throttle valve opening degree and an intake air amount, a fuel supply amount, and an ignition timing, electrically controlled by an engine-control electronic control device (E-ECU) not depicted mainly made up of a microcomputer. The electronic control device is supplied with detection signals from an accelerator operation amount sensor AS detecting an operation amount of an accelerator pedal, a brake sensor BS for detecting the presence of operation of a brake pedal, etc.

The first electric motor MG1 is, for example, a synchronous electric motor, configured to selectively fulfill a function as an electric motor generating a drive torque and a function as an electric generator, and is connected via an inverter 30 to an electric storage device 32 such as a battery and a capacitor. The inverter 30 is controlled by a motor-generator-control electronic control device (MG-ECU) not depicted mainly made up of a microcomputer, thereby adjusting or setting output torque or regenerative torque of the first electric motor MG1.

The planetary gear device 26 is a single pinion type planetary gear mechanism including a sun gear S0, a ring gear R0 disposed concentrically to the sun gear S0, and a carrier CA0 supporting a pinion gear P0 meshing with the sun gear S0 and the ring gear R0 in a rotatable and revolvable manner as three rotating elements to generate a known differential action. The planetary gear device 26 is disposed concentrically to the engine 24 and the automatic transmission 22. Since the planetary gear device 26 and the automatic transmission 22 are symmetrically configured relative to a center line, the lower halves thereof are not depicted in FIG. 1.

In this example, a crankshaft 36 of the engine 24 is coupled via a damper device 38 (corresponding to a vehicle damper device of the present invention) and a power transmission shaft 39 to the carrier CA0 of the planetary gear device 26. On the other hand, the sun gear S0 is coupled to the first electric motor MG1, and the ring gear R0 is coupled to the wheel-side output shaft. The carrier CA0, the sun gear S0, and the ring gear R0 act as an input element, a reaction force element, and an output element, respectively.

If a reaction torque from the first electric motor MG1 is input to the sun gear S0 for an output torque of the engine 24 input to the carrier CA0 in the planetary gear device 26, a direct torque occurs in the ring gear R0 that is the output element and, therefore, the first electric motor MG1 acts as an electric generator. When the rotation speed of the ring gear R0, i.e., the rotation speed (output shaft rotation speed) Nout of the wheel-side output shaft 14 is constant, a rotation speed (engine rotation speed) Ne of the engine 24 can (continuously) be changed by changing a rotation speed Nmg1 of the first electric motor MG1 higher and lower.

The automatic transmission 22 of this example is made up of a set of Ravigneaux type planetary gear mechanisms. In other words, the automatic transmission 22 is disposed with a first sun gear S1 and a second sun gear S2; a larger diameter portion of a stepped pinion P1 meshes with the first sun gear S1; a smaller diameter portion of the stepped pinion P1 meshes with a pinion P2; and the pinion P2 meshes with a ring gear R1 (R2) disposed concentrically to the sun gears S1 and S2. The pinions 1 and P2 are held by a common carrier CA1 (CA2) in a rotatable and revolvable manner. The second sun gear S2 meshes with the pinion P2.

The second electric motor MG2 is controlled via an inverter 40 by the motor-generator-control electronic control device (MG-ECU) to act as an electric motor or an electric generator and an assist output torque or a regenerative torque is adjusted or set. The second sun gear S2 is coupled to the second electric motor MG2 and the carrier CA1 is coupled to the wheel-side output shaft. The first sun gear S1 and the ring gear R1 make up a mechanism corresponding to a double pinion type planetary gear device along with the pinions P1 and P2, and the second sun gear S2 and the ring gear R1 make up a mechanism corresponding to a single pinion type planetary gear device along with the pinion P2.

The automatic transmission 22 is disposed with a first brake B1 disposed between the first sun gear S1 and a housing 42 that is a non-rotating member for selectively fixing the first sun gear S1, and a second brake B2 disposed between the ring gear R1 and the housing 42 for selectively fixing the ring gear R1. The brakes B1, B2 are so-called friction engagement devices using a frictional force to generate a braking force and are implemented by employing multi-plate type engagement devices or band-type engagement devices. The brakes B1, B2 are configured such that torque capacities thereof are respectively continuously changed depending on engagement pressures generated by a hydraulic actuator for the brake B1 and a hydraulic actuator for the brake B2 such as hydraulic cylinders.

The automatic transmission 22 configured as described above is configured such that the second sun gear S2 acts as an input element, that the carrier CA1 acts as an output element, that a high-speed stage H is established with a gear ratio γsh greater than "1" when the first brake B1 is engaged, and that a low-speed stage L is established with a gear ratio γsl greater than the gear ratio γsh of the high-speed stage H when the second brake B2 is engaged instead of the first brake B1. In other words, the automatic transmission 22 is a two-speed transmission in which a shift between the gear stages H and L is performed based on a running state such as a vehicle speed V and a required drive power (or an accelerator operation amount). More specifically, shift stage ranges are determined in advance as a map (shift diagram) and control is provided such that one of the shift stages is set depending on a detected operational state.

Figure 2:
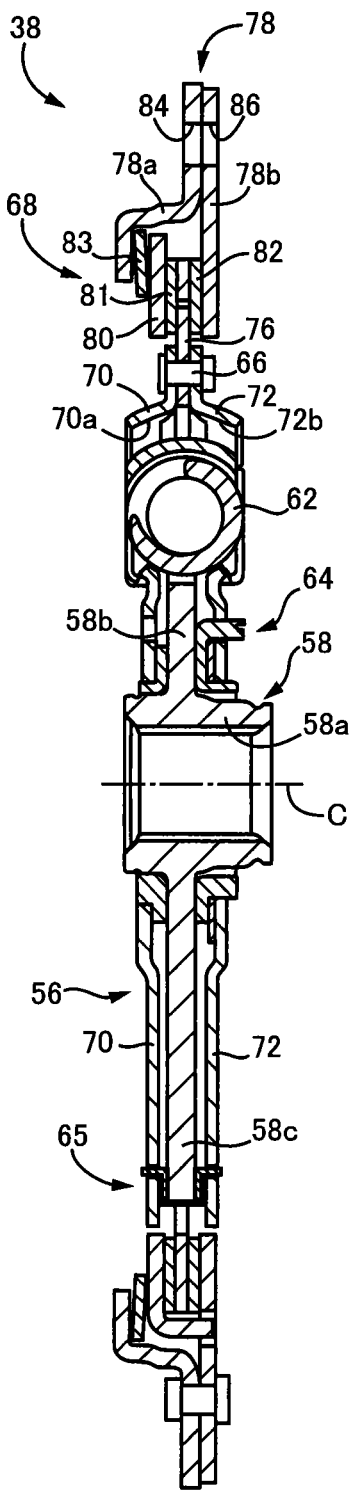
FIG. 2 is a cross-sectional view for explaining a configuration of the damper device depicted in FIG. 1 in detail.

FIG. 2 is a cross-sectional view for explaining a configuration of the damper device 38 depicted in FIG. 1 in detail. The damper device 38 is disposed around an axial center C between the engine 24 and the planetary gear device 26 in a power transmittable manner. The power transmission shaft 39 depicted in FIG. 1 is spline-fitted to an inner circumferential portion of the damper device 38.

The damper device 38 includes a disc plate 56 rotatable around the axial center C, a hub member 58 disposed relatively rotatably to the disc plates 56 around the same axial center C, coil springs 62 made of spring steel interposed between the disc plate 56 and the hub member 58 to transmit power between the disc plate 56 and the hub member 58, a first hysteresis mechanism 64 generating a hysteresis torque between the disc plate 56 and the hub member 58, a second hysteresis mechanism 65 disposed on an outer circumferential end portion of the hub member 58 and generating a hysteresis torque between the disc plate 56 and the hub member 58, and the torque limiter mechanism 68 disposed on the outer circumferential side of the disc plate 56. The coil springs 62 correspond to an elastic member of the present invention.

The disc plate 56 is made up of a pair of a first disc plate 70 (hereinafter, a first plate 70) and a second disc plate 72 (hereinafter, a second plate 72) each having a disc shape on the right and left respectively and is relatively non-rotatably fixed by a rivet 66 with the coil springs 62 axially sandwiched by the plates 70 and 72. The rivet 66 also acts as a fastening member of a lining plate 76 that is a component of the torque limiter mechanism 68 described later. The first plate 70 has a plurality of first opening holes 70a formed in a circumferential direction for housing the coil springs 62. The second plate 72 has a plurality of second opening holes 72a formed in the circumferential direction at positions corresponding to the first opening holes 70a for housing the coil springs 62. A plurality of the (e.g., four) coil springs 62 is housed at regular angular intervals in spaces formed by the first opening holes 70a and the second opening holes 72a. As a result, when the disc plate 56 rotates around the axial center C, the coil springs 62 are revolved around the axial center C in the same way.

The hub member 58 is made up of a cylindrical portion 58a including inner circumferential teeth spline-fitted to the power transmission shaft 39 in an inner circumferential portion, a circular-plate-shaped flange portion 58b radially extending outward from an outer circumferential surface of the cylindrical portion 58a, and a plurality of (in this example, three) projecting portions 58c further radially projecting outward from the flange portion 58b. The coil springs 62 are inserted in spaces formed between the projecting portions 58c in the rotation direction. As a result, when the hub member 58 rotates around the axial center C, the coil springs 62 are revolved around the axial center C in the same way. With such a configuration, the coil springs 62 transmit power while elastically deforming depending on a relative rotation amount between members of the disc plate 56 and the hub member 58. For example, when the disc plate 56 rotates, one ends of the coil springs 62 are pressed and the other ends of the coil springs 62 press the projecting portions 58c of the hub member 58, thereby rotating the hub member 58. In this case, since the coil springs 62 transmit the rotation while being elastically deformed, a shock due to torque variation is absorbed by the coil springs 62.

The first hysteresis mechanism 64 is disposed on the inner circumferential side of the coil springs 62 and between the disc plate 56 and the flange portion 58b of the hub member 58 in an axial direction. The hysteresis mechanism 64 is made up of a friction material, a disc spring, etc., and generates a friction force between the disc plate 56 and the hub member 58. The first hysteresis mechanism 64 of this example acts as a mechanism generating a small hysteresis torque (small hysteresis).

The torque limiter mechanism 68 is disposed on the outer circumferential side of the disc plate 56 and has a function of preventing torque transmission exceeding a preset limit torque Tlim. The torque limiter mechanism 68 includes the annular-plate-shaped lining plate 76 fastened by the rivet 66 along with the disc plate 56 to rotate along with the disc plate 56, a support plate 78 disposed on the outer circumferential side rotatably around the axial center C, a circular-plate-shaped annular pressure plate 80 disposed on the inner circumferential side of the support plate 78 rotatably around the axial center C, a first friction material 81 interposed between the pressure plate 80 and the lining plate 76, a second friction material 82 interposed between the lining plate 76 and the support plate 76, and a cone-shaped disc spring 83 interposed in a preloaded state in a gap between the pressure plate 80 and the support plate 78.

The support plate 78 is made up of a disc-shaped first support plate 78a and a circular-plate-shaped second support plate 78b having outer circumferential portions disposed with bolt holes 84 and 86, respectively, for bolt-fastening not depicted fixing a flywheel 50 and the support plates 78a and 78b. The first support plate 78a has an inner circumferential portion bent in the axial direction to form a space between the first support plate 78a and the second support plate 78b. This space houses the disc spring 83, the pressure plate 80, the first friction material 81, the lining plate 76, and the second friction material 82 in this order from the first support plate 78a toward the second support plate 78b in the axial direction.

The lining plate 76 is an annular-plate-shaped member fixed by the rivet 66 along with the first plate 70 and the second plate 72. The pressure plate 80 is also formed into an annular plate shape. The first friction material 81 is interposed between the pressure plate 80 and the lining plate 76. The first friction material 81 is formed into an annular plate shape, for example. Alternatively, the first friction materials 81 may be formed into an arc shape and arranged at regular angular intervals side-by-side in the circumferential direction. The first friction material 81 is stuck to the lining plate 76, for example.

The second friction material 82 is interposed between the inner circumferential portion of the second support plate 78b and the lining plate 76. The second friction material 82 is formed into, for example, an annular plate shape as is the case with the first friction material 81. Alternatively, the second friction materials 82 may be formed into an arc shape and arranged at regular angular intervals side-by-side in the circumferential direction. The second friction material 82 is stuck to the lining plate 76, for example.

The disc spring 83 is interposed in the preloaded state between the first support plate 78a and the pressure plate 80. The disc spring 83 is formed into a cone shape with an inner circumferential end portion thereof abutting on the pressure plate 80 and an outer circumferential end portion abutting on the first support plate 78a and is deformed and interposed to have a deflection amount generating the preload (disc spring load W). Therefore, the disc spring 83 axially presses the pressure plate 80 toward the lining plate 76 by the disc spring load W. As a result, a friction force is generated on friction surfaces between the pressure plate 80 and the first friction material 81, as well as friction surfaces between the second support plate 78b and the second friction material 82. The torque limiter mechanism 68 is set to the optimum limiter torque Tlm by adjusting a friction coefficient μ, an operation radius r of the friction materials 81, 82, and the disc spring load W.

Figure 3:
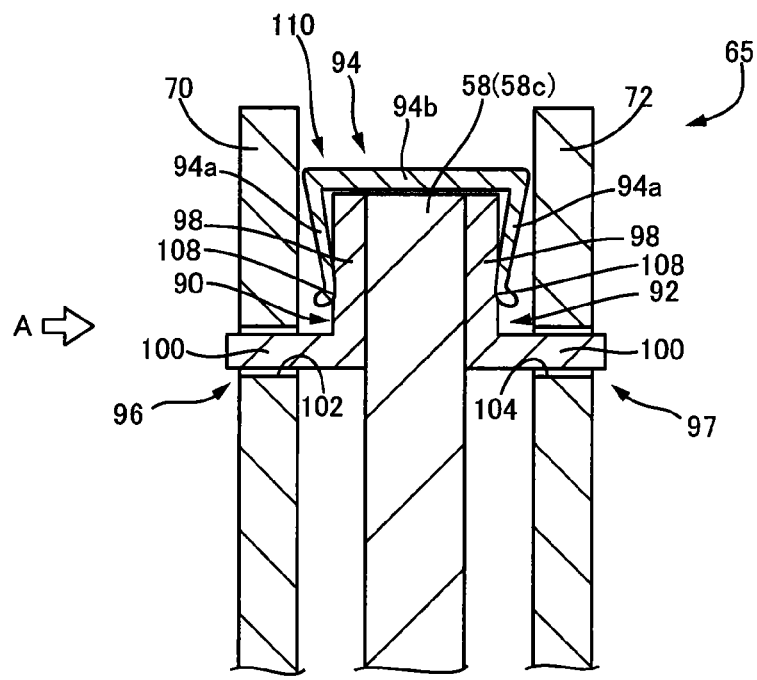
FIG. 3 is a partially enlarged view of the second hysteresis mechanism of FIG. 2 partially enlarged.

The second hysteresis mechanism 65 is disposed on the outer circumferential end portion of the hub member 58 (the projecting portion 58c). A structure of the second hysteresis mechanism 65 will be described in detail with reference to a cross-sectional view depicted in FIG. 3. FIG. 3 is a partially enlarged view of the second hysteresis mechanism 65 of FIG. 2 partially enlarged. The upper side of FIG. 3 corresponds to an outer circumferential direction of the damper device 38 of FIG. 2. As can be seen from FIG. 3, the second hysteresis mechanism 65 is disposed on the outer circumferential end portion of the hub member 58. The second hysteresis mechanism 65 includes a pair of a plate 90 and a plate 92 in sliding contact with the hub member 58, a clip 94 axially pushing a pair of the plates 90 and 92 from the both axial sides toward the hub member 58, and stoppers 96 and 97 defining a relative rotation amount between the disc plate 56 (the first plate 70, the second plate 72) and the plates 90, 92. In this example, the plate 90 and the plate 92 are formed into the same shape, and the stopper 96 and the stopper 97 are formed into the same shape. Therefore, the second hysteresis mechanism 65 has the plate 90 and the plate 92, as well as the stopper 96 and the stopper 97, configured to be symmetric across the hub member 58. The plate 90 and the plate 92 correspond to a friction plate portion of the present invention, and the clip 94 corresponds to pressing portion and a clip of the present invention.

A pair of the plates 90 and 92 each having one surface in sliding contact with the hub member 58 is disposed on the outer circumferential end portion of the hub member 58 (the projecting portion 58c) and each includes a plate-shaped sliding contact portion 98 in sliding contact with the hub member 58 and a projection 100 axially projecting from an inner circumferential end portion of the sliding contact portion 98 toward the disc plate 56 (70, 72).

Figure 4:
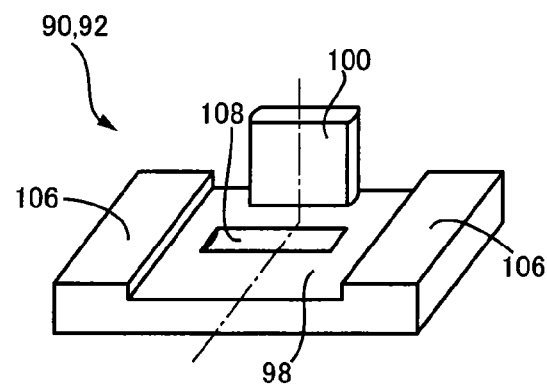
FIG. 4 is a perspective view of the plate depicted in FIG. 3.

FIG. 4 is a perspective view of the plates 90 and 92. The cross-sectional view of the plates 90 and 92 of FIG. 3 corresponds to a cross-sectional view taken along a dashed-dotted line of FIG. 4. As depicted in FIG. 4, the sliding contact portion 98 of the plates 90 and 92 is formed into a rectangular shape, for example. The projection 100 is formed to project from a surface of the sliding contact portion 98 on the side not in sliding contact with the hub member 58 in a perpendicular direction (in the axial direction in FIG. 3). The respective projections 100 penetrate a cutout 102 formed in the first plate 70 and a cutout 104 formed in the second plate 72.

Stepped portions 106 projecting from the sliding contact portion in the perpendicular direction (in the axial direction in FIG. 3) are formed on the both longitudinal ends of the sliding contact portion 98. The sliding contact portion 98 has a recess 108 in parallel with a longitudinal direction of the sliding contact portion 98. The stepped portions 106 are disposed for allowing the clip 94 to abut on the stepped portions 106 so that the clip 94 is prevented from coming off even if the clip 94 is displaced in the circumferential direction (in the longitudinal direction in FIG. 4) at the time of clamping of the clip 94.

Returning to FIG. 3, the clip 94 is made of spring steel and is made up of a pair of clamping portions 94a having inner circumferential end portions abutting on the plates 90, 92 and a coupling portion 94b coupling outer circumferential end portions of the pair of the clamping portions 94a. The clip 94 axially clamps the plates 90 and 92 astride the hub member 58 (the projecting portion 58c), and the coupling portion 94b couples the pair of the clamping portions 94a through the outer circumferential side of the hub member 58. A friction element 110 is made up of the plates 90 and 92 in sliding contact with the hub member 58 and the clip 94 pinching the plates 90 and 92 substantially perpendicularly to the surfaces in sliding contact with the hub member 58. The friction element 110 is disposed on the outer circumferential end portion of the hub member 58 (the projecting portion 58c). The friction element 110 is the second hysteresis mechanism 65 without stoppers 96 and 97.

Tip portions (abutting portions) of the clamping portions 94a of the clip 94 are fitted into the recesses 108 formed in the sliding contact portions 98 of the plates 90 and 92. Since the tip portions of the clamping portions 94a are fitted into the recesses 108 in this way, the clip 94 is prevented from coming off from the plates 90 and 92.

The stopper 96 is made up of the projection 100 formed on the plate 90, and the cutout 102 formed in the first plate 70. The stopper 97 is made up of the projection 100 formed on the plate 92, and the cutout 104 formed in the second plate 72. Each of the cutout 102 formed in the first plate 70 and the cutout 104 formed in the second plate 72 is formed into a groove along the circumferential direction so that a movement amount of the projection 100 in the circumferential direction can be regulated to a defined value. As a result, the stopper 96 has a function of regulating a relative rotation amount between the plate 90 and the first plate 70 to a defined value and the stopper 97 has a function of regulating a relative rotation amount between the plate 92 and the second plate 72 to a defined value.

Figure 5:
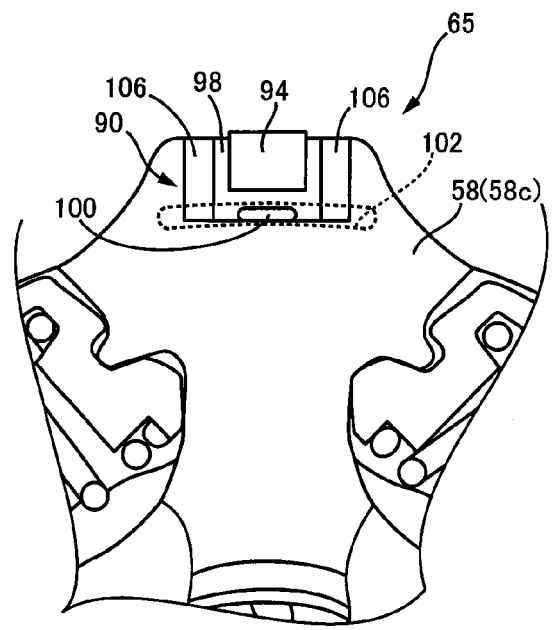
FIG. 5 is an A-arrow view of the second hysteresis mechanism viewed from arrow A with the first plate of FIG. 3 removed.

FIG. 5 is an A-arrow view of the second hysteresis mechanism 65 viewed from arrow A with the first plate 70 removed in FIG. 3. In FIG. 5, only the cutout 102 formed in the first plate 70 is indicated by a broken line. The projecting portions 58c of the hub member 58 in this example are circumferentially formed at three locations, and the same second hysteresis mechanisms 65 are respectively disposed on the projecting portions 58c (see FIG. 6).

As depicted in FIG. 5, the second hysteresis mechanism 65 and the friction element 110 making up the second hysteresis mechanism 65 are disposed on the outer circumferential end portion of the hub member 58 (the projecting portion 58c). The plate 90 is fixed by the clip 94 pinching the plate 90 and the plate 92 astride the hub member 58. The same shape as FIG. 5 is achieved on the plate 92 side such that the plate 92 is fixed by the clip 94. With such a configuration, the plate 90 and the hub member 58 integrally rotate within a range in which the projection 100 is movable in the cutout 102 formed in the first plate 70. If the projection 100 abuts on a circumferential end portion of the cutout 102, a slip occurs on the sliding contact surfaces between the plate 90 and the hub member 58 and a hysteresis torque is generated on this occasion. The hysteresis torque is in proportion to the friction coefficient μ of the sliding contact surfaces between the plate 90 and the hub member 58, the disc spring load W of the clip 94, and the operation radius r of the plate 90, which are adjusted to appropriately set the hysteresis torque. Since the friction element 110 making up the second hysteresis mechanism 65 is disposed on the outer circumferential end portion of the hub member 58, the operation radius r is large. Therefore, even a large hysteresis torque can easily be generated.

Figure 6:
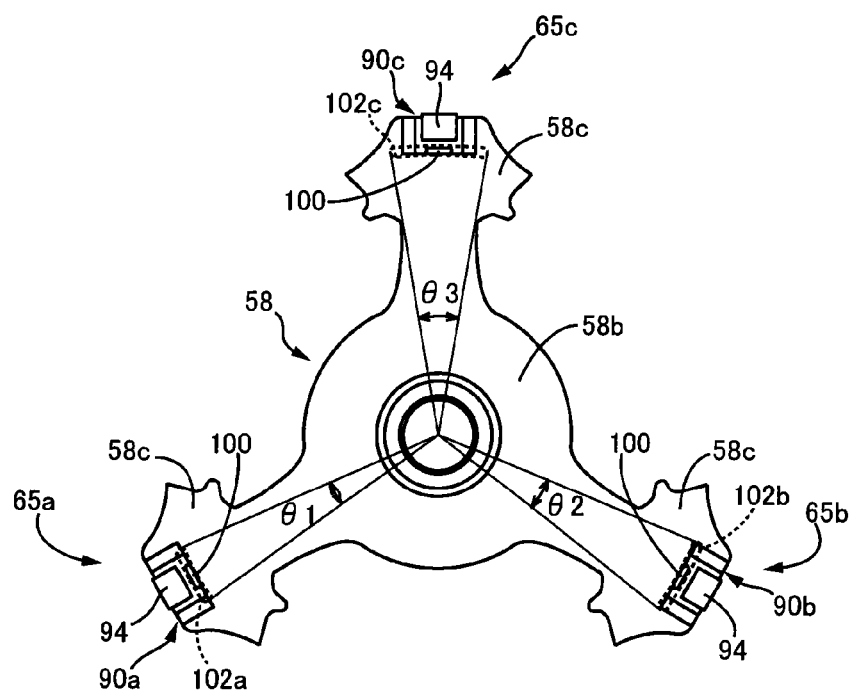
FIG. 6 is a view of the entire circumference of the second hysteresis mechanism of FIG. 5.

FIG. 6 is a view of the entire circumference of the second hysteresis mechanism 65 of FIG. 5. In this example, the three projecting portions 58c radially project from the hub member 58. The second hysteresis mechanism 65 is disposed on each of the projecting portions 58c. Respective reference numerals are given for convenience such that the second hysteresis mechanism 65 on the left lower side of FIG. 6 is defined as a second hysteresis mechanism 65a with a second hysteresis mechanism 65b and a second hysteresis mechanism 65c defined anticlockwise from the second hysteresis mechanism 65a. In the second hysteresis mechanisms 65a to 65c, the shapes of the plates 90, the plates 92, the clips 94, and the projects 100 are formed into the same respective shapes. The friction coefficients μ of the sliding surfaces between the hub member 58 and the plates 90, 92 are set to the same value.

On the other hand, a circumferential groove width of each of the cutouts 102 (102a to 102d) formed in the first plates 70 indicated by broken lines is set to a different value for each of the second hysteresis mechanisms 65. Therefore, an operation angle allowing circumferentially movement of the projection 100 is differentiated. Specifically, an operation angle θ1 of the second hysteresis mechanism 65a is the smallest, and an operation angle θ2 of the second hysteresis mechanism 65b is larger than the operation angle θ1 while an operation angle θ3 of the second hysteresis mechanism 65c is larger than the operation angle θ2. The cutouts 104 of the second plates 72 formed at the positions symmetric to the cutouts 102 astride the hub member 58 are set to the same groove width as the respective cutouts 102. The groove widths of the cutouts 102 are set in advance based on experiments etc., such that aimed hysteresis torques are generated.

Figure 7:
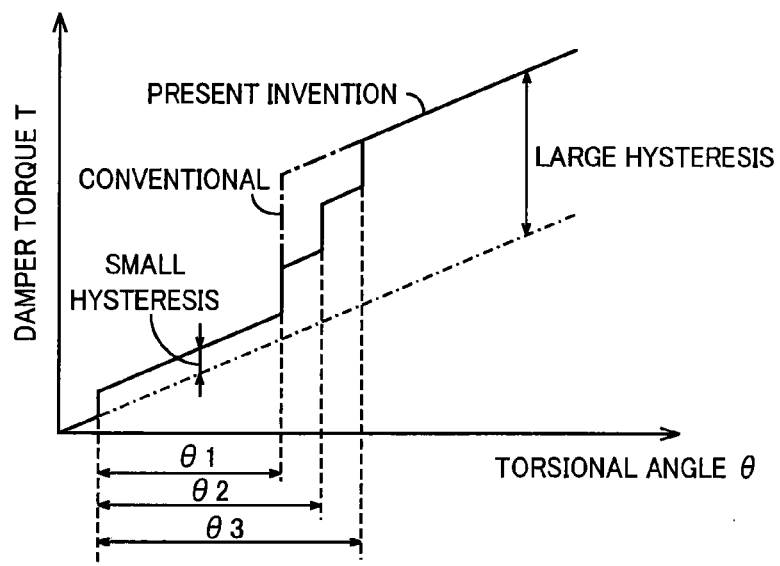
FIG. 7 is a diagram of relationship between a damper torque transmitted to the damper device of FIG. 2 and a torsional angle $\theta$.

FIG. 7 depicts relationship between a damper torque T transmitted to the damper device 38 and a torsional angle θ. The horizontal axis indicates the torsional angle of the damper device 38 and the vertical axis indicates the damper torque T. As depicted in FIG. 7, small hysteresis (small hysteresis torque) is generated in an area of a smaller torsional angle θ. This small hysteresis is due to the first hysteresis mechanism 64 of the damper device 38. In this case, a slip does not occur in any of the second hysteresis mechanisms 65a to 65c. When the operation angle of the projection 100 reaches the torsional angle θ of θ1, a slip occurs in the second hysteresis mechanism 65a. As a result, the hysteresis torque increases. When the operation angle of the projection 100 then reaches the torsional angle θ of θ2, a slip occurs in the second hysteresis mechanism 65a. As a result, the hysteresis torque further increases. When the operation angle of projection 100 then reaches the torsional angle θ of θ3, a slip occurs also in the second hysteresis mechanism 65c. As a result, the hysteresis torque further increases.

By changing the timing when each of the second hysteresis mechanisms 65a to 65c starts slipping in this way, as depicted in FIG. 7, transition characteristics from the small hysteresis to the large hysteresis (large hysteresis torque) can be changed in stages. Since a characteristic change difference from the small hysteresis to the large hysteresis is made larger as indicated by a dashed-dotted line and vehicle behavior becomes marked in the conventional case, optimum hysteresis setting is difficult. On the other hand, since the change from the small hysteresis to the large hysteresis can be smoothed in stages in this example, the setting from the small hysteresis to the large hysteresis can be set without impairing vehicle performance.

As described above, in this example, when the stoppers 96 and 97 are actuated and the relative rotation is regulated between the plates 90, 92 and the disc plate 56, a slip occurs between the plates 90, 92 and the hub member 58. As a result, a friction force is generated between the plates 90, 92 and the hub member 58, and a hysteresis torque is generated based on this friction force. Since this configuration can be achieved by simply providing the plates 90, 92, the clip 94, and the stoppers 96, 97, the hysteresis torque can be acquired with a simple configuration without a significant design change. As compared to a conventional two-stage hysteresis mechanism, the number of components is significantly reduced and the structure is simplified. Since changes from a conventional structure are few, the versatility becomes very high.

According to this example, although the conventional two-stage hysteresis mechanism uses expensive high friction material for generating a large hysteresis torque, since the friction element 110 of the second hysteresis mechanism 65 is disposed on the outer circumferential end portion of the hub member 58 in this example, the operation radius r of the friction element 110 making up the second hysteresis mechanism 65 can be made larger. Therefore, the large hysteresis torque can be generated even with conventional friction material including nylon resin etc. Since the second hysteresis mechanism 65 and the friction element 110 making up the second hysteresis mechanism 65 are disposed on the outer circumferential end portion of the hub member 58, a restriction on space is reduced when the second hysteresis mechanism 65 is provided, and the versatility becomes very high.

According to this example, at least the two friction elements 110 making up the second hysteresis mechanisms 65 are disposed and the relative rotation amount defined by the stoppers 96 and 97 are differentiated for each of the second hysteresis mechanisms 65. As a result, by shifting the timing when each of the friction elements 110 starts slipping, the hysteresis toque can be changed in stages. For example, when the small hysteresis torque is switched to the large hysteresis torque, the hysteresis torque can be changed in stages to suppress a change in vehicle behavior when the small hysteresis torque is switched to the large hysteresis torque. Therefore, even if a large difference exists between the small hysteresis torque and the large hysteresis torque, the switch can be made and the effect of hysteresis can be maximized.

According to this example, the plates 90, 92 and the clip 94 making up the friction element 110 are separately configured and the clip 94 pinches a pair of the plates 90 and 92 in sliding contact with the hub member 58. As a result, the friction element 110 is made up of the pair of the plates 90, 92 and the clip 94 and, therefore, the friction element 110 can be configured with a simple structure having a fewer number of components.

According to this example, the stepped portions 106 regulating the circumferential movement relative to the clip 94 are formed on the both circumferential ends of the plates 90 and 92. As a result, even if the clip 94 is displaced in the circumferential direction, the clip 94 abuts on the stepped portions 106 and, therefore, the clip 94 is prevented from coming off.

According to this example, the stoppers 96, 97 are made up of the projections 100 projecting from the plates 90, 92 to the plates 70, 72, and the cutouts 102, 104 formed in the plates 70, 72 to regulate the movement amounts of the projections 100. As a result, the stoppers 96 and 97 can easily be configured without increasing the number of components.

According to this example, although most of the components have a circular plate shape in the conventional hysteresis mechanism, since the second hysteresis mechanism 65 is disposed on the outer circumferential end portion of the hub member 58 in the present invention, each of the components has a piece shape. Therefore, a material yield can significantly be improved when the components are manufactured.

Another example of the present invention will be described. In the following description, the portions common with the example are denoted by the same reference numerals and will not be described.

Second Example

Figure 8:
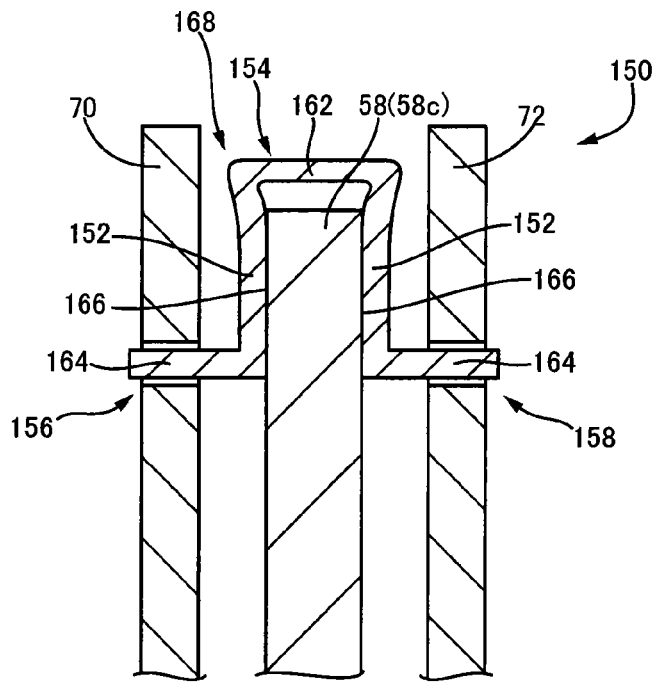
FIG. 8 is an enlarged view of a second hysteresis mechanism that is another example of the present invention, corresponding to FIG. 3 of the example.

FIG. 8 is an enlarged view of a second hysteresis mechanism 150 that is another example of the present invention, corresponding to FIG. 3 of the example. The second hysteresis mechanism 150 of this example is disposed on the outer circumferential end portion of the hub member 58 (the projecting portion 58c). Comparing the second hysteresis mechanism 150 with the second hysteresis mechanism 65 of the example described above, the plates (90, 92) and the clip (94) are integrally formed. Specifically, the second hysteresis mechanism 150 includes a clip member 154 including plate portions 152 in sliding contact with the hub member 58, and stoppers 156 and 158 defining a relative rotation amount between the disc plate 56 (the first plate 70, the second plate 72) and the clip member 154. The stoppers 156 and 158 have the same structure as the stoppers 96 and 97 of the example and therefore will not be described.

The clip member 154 is a member acquired by integrally forming a pair of the plate portions 152 each having one surface in sliding contact with the hub member 58, a coupling portion 162 coupling the pair of the plate portions 152, and a pair of projections 164 axially projecting from the inner circumferential ends of the plate portions 152. The pair of projections 164 acts as members making up the respective stoppers 156 and 158.

The clip member 154 is made of spring steel etc. and is formed to generate a preload (spring load) set in advance while pinching the hub member 58. Therefore, while the clip member 154 pinches the hub member 58, the pair of the plate portions 152 axially clamps the hub member 58 and, therefore, a hysteresis torque is generated based on a friction force generated on sliding contact surfaces 166 between the hub member 58 and the plate portions 152. As described above, the clip member 154 includes both the plate portions 152 (friction plate portions) and the function of pushing the plate portions 152 against the hub member 58 (a pressing portion). Therefore, the clip member 154 makes up a friction element 168 of the present invention. The operation and effect of the hysteresis mechanism 150 are the same as the example and will not be described.

As described above, according to this example, the effect same as the example can also be acquired when the second hysteresis mechanism 150 is made up of the clip member 154 and the stoppers 156 and 158. Since the clip member 154 is given a function of a clip and a function of a friction plate, the number of components making up the second hysteresis mechanism 150 can further be reduced.

Although the examples of the present invention have been described in detail with reference to the drawings, the present invention is applied in other forms.

For example, although the projections 100 formed on the plates 90 and 92 are positioned on the inner circumferential end portion sides of the plates 90 and 92 in the example, the positions are not necessarily limited to the inner circumferential end portions and may be changed within a range where the clip 94 can pinch the sliding contact portions 98 of the plates 90 and 92.

Although the shapes of the plate 90 and the plate 92 are the same shape in the examples, the shapes may not necessarily be the same shape.

Although the hysteresis torques generated by the second hysteresis mechanisms 65a to 65b are equal in the example, the hysteresis torques may not necessarily be equal and may be set differently. The hysteresis torques may freely be changed such as setting the hysteresis torque generated by the second hysteresis mechanism 65c larger than the hysteresis torques generated by the other second hysteresis mechanisms 65a and 65b, for example.

Although the circumferential groove widths of the cutouts 102 and 104 are changed to vary the timing when the second hysteresis mechanisms 65a to 65c start slipping in the example, the circumferential widths of the projections 100 may respectively be changed to vary the timing when the hysteresis mechanisms 65a to 65c start slipping. Both the circumferential groove widths of the cutouts 102 and 104 and the circumferential widths of the projections 100 may be changed to vary the timing when the hysteresis mechanisms 65a to 65c start slipping.

Although the stopper 96 and the stopper 97 are disposed in the example, a configuration disposed with either one may be available.

Although the three second hysteresis mechanisms 65a to 65c are circumferentially disposed in the example, not all the outer circumferential end portions of the hub member 58 may be disposed with the second hysteresis mechanism 65, and a configuration disposed with at least the one second hysteresis mechanism 65 may be available. If the projecting portions 58c of the hub member 58 are disposed at four or more locations, the second hysteresis mechanisms 65 may be disposed at four or more locations.

Although the first hysteresis mechanism 64 is disposed in the example, a configuration without the first hysteresis mechanism 64 may be made available by giving the function of the first hysteresis mechanism 64 to the second hysteresis mechanism 65.

Although the stepped portions 106 and the recess 108 are formed in the plates 90 and 92 in the example, the stepped portions 106 and the recess 108 may not necessarily be disposed and a configuration without the stepped portions 106 and the recess 108 may be available.

Although the sliding contact portions 98 of the plates 90 and 92 are formed into a rectangular shape in the example, the shape is not limited to a rectangular shape and may be a square or arc shape.

Although the coil springs 62 made of spring steel are interposed between the disc plate 56 and the hub member 58 of the damper device 38 in the example, the coil springs 62 are not necessarily a limitation and an elastic member made of rubber etc., may be interposed.

At least the two second hysteresis mechanisms 150 of the example may be disposed to vary the hysteresis torque in stages.

The above description is merely an embodiment and the present invention may be implemented in variously modified and improved forms based on the knowledge of those skilled in the art.

NOMENCLATURE OF ELEMENTS

38: damper device 56: disc plate 58: hub member 62: coil spring (elastic member) 70: first disc plate (disc plate) 72: second disc plate (disc plate) 90: plate (friction plate portion) 92: plate (friction plate portion) 94: clip 96: stopper 97: stopper 100: projection 102: cutout 104: cutout 106: stepped portion 108: recess 110: friction element 152: plate portion (friction plate portion) 154: clip member (friction plate portion, pressing portion) 156: stopper 158: stopper 164: projection 168: friction element

The invention claimed is:

1. A vehicle damper device having a disc plate rotatable around an axial center, a hub member rotatable around the same axial center as the disc plate, and an elastic member interposed between the disc plate and the hub member, comprising:
a friction element configured to include a friction plate portion in sliding contact with the hub member and a pressing portion pushing the friction plate portion against the hub member; and a stopper defining a relative rotation amount between the friction plate portion and the disc plate,
the friction element being disposed on an outer circumferential end portion of the hub member,
the friction plate portion and the pressing portion making up the friction element are separately configured,
the friction plate portion is made up of a pair of friction plates,
the pressing portion is a clip pinching the pair of the friction plates in sliding contact with the hub member, and
each of the friction plates has stepped portions formed at both circumferential ends, wherein the stepped portions regulate circumferential relative movement of the clip.

2. The vehicle damper device of claim 1, wherein
the friction element is one of at least two friction elements disposed in the vehicle damper device, and wherein
the relative rotation amount defined by the stopper is differentiated for each of the fiction elements.

3. The vehicle damper device of claim 1, wherein each of the friction plates has a recess formed in a portion abutting on the clip.

4. The vehicle damper device of claim 1, wherein the stopper is made up of a projection projecting from the friction plate portion toward the disc plate and a cutout formed in the disc plate to regulate a movement amount of the projection.

* * * * *